US006768858B2

(12) United States Patent
Tinucci et al.

(10) Patent No.: US 6,768,858 B2
(45) Date of Patent: Jul. 27, 2004

(54) CABLE CLIP WITH SEGREGATOR AND METHOD

(75) Inventors: Thomas C. Tinucci, Eden Prairie, MN (US); John C. Holman, Coon Rapids, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 293 days.

(21) Appl. No.: 09/811,368

(22) Filed: Mar. 16, 2001

(65) Prior Publication Data

US 2002/0136519 A1 Sep. 26, 2002

(51) Int. Cl.[7] .................................................. G02B 6/00
(52) U.S. Cl. ....................... 385/134; 385/135; 385/136
(58) Field of Search ................................ 385/134, 135, 385/136, 137

(56) References Cited

U.S. PATENT DOCUMENTS

| 5,625,737 A | | 4/1997 | Saito | 385/137 |
|---|---|---|---|---|
| 5,765,698 A | | 6/1998 | Bullivant | 211/26 |
| 6,044,194 A | * | 3/2000 | Meyerhoefer | 385/134 |

FOREIGN PATENT DOCUMENTS

| JP | 10-274359 | 10/1998 |
|---|---|---|
| JP | 11-122758 | 4/1999 |

OTHER PUBLICATIONS

Front and rear cover and pp. 109–117 and 140141 of Richco Inc. Catalog 25R, undated.
Application Ser. No. 09/810,935, filed Mar. 16, 2001.

* cited by examiner

Primary Examiner—Chandrika Prasad
(74) Attorney, Agent, or Firm—Merchant & Gould P.C.

(57) ABSTRACT

A cable routing clip consists of a rear crosspiece, two clip arms extending from the front of the crosspiece and forming an open end slot, a pair of retaining members extending across the open end of the slot and one or more mounting tabs extending from the rear of the crosspiece. The inside faces of the clips arms are rounded to provide edge protection to cables held by the clip and the outer faces are planar and suitable for applying indicia of the cables within the slot. A front face of a retaining member is also planar and can accept indicia. The rear mounting tabs fit into rectangular slots and include ramped faces and locking notches. When two tabs are present, one of the tabs can be shorter than the so that a smaller rectangular slot can used on one side of a pair of mounting slots. The invention also relates to a riser with one or more channels which receive telecommunications cables and directs and organizers these cables into a plurality of vertical cable paths defined by a plurality of cable clips.

31 Claims, 15 Drawing Sheets

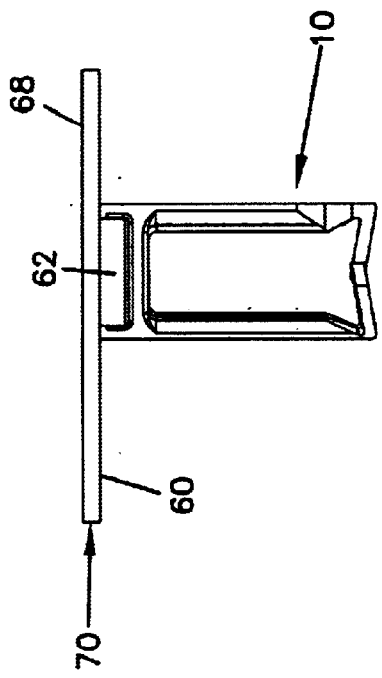
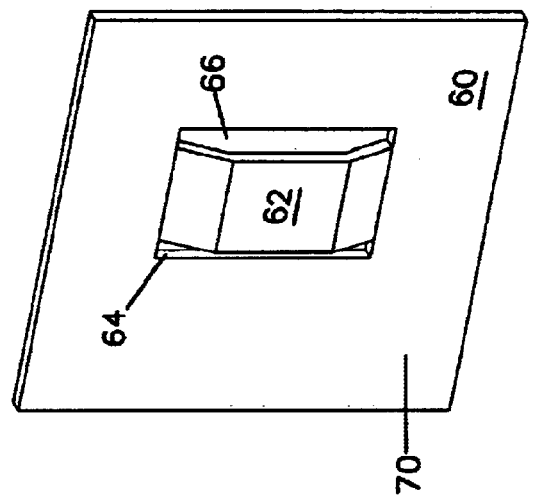
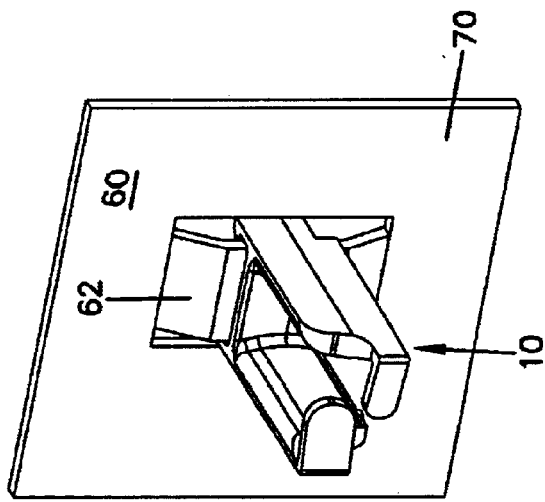

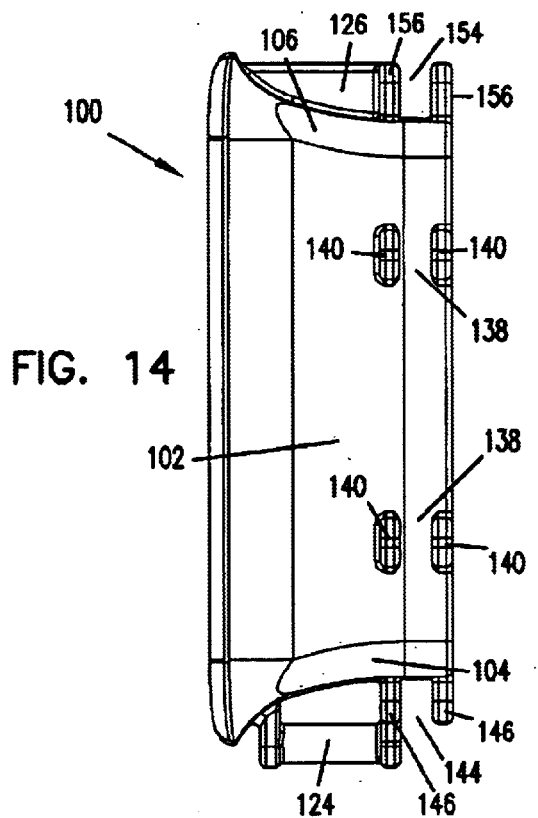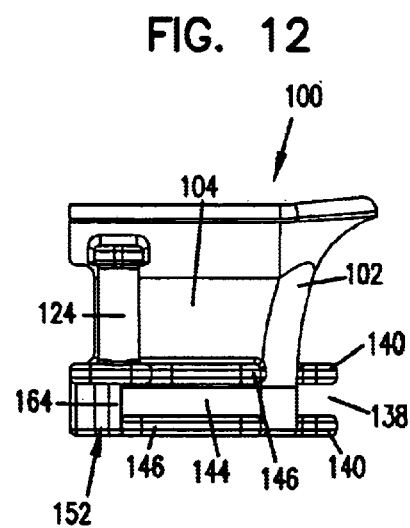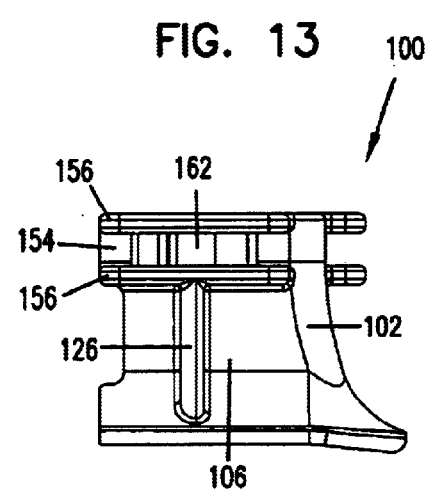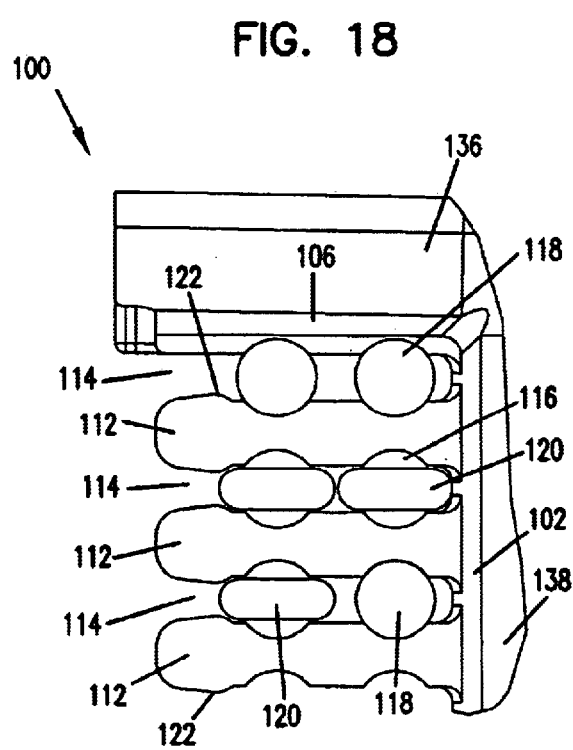

US 6,768,858 B2

CABLE CLIP WITH SEGREGATOR AND METHOD

FIELD OF THE INVENTION

The present invention relates to fiber optic cable and other cable management for use in telecommunications systems.

BACKGROUND OF THE INVENTION

Telecommunications equipment utilizing optical fiber for signal transmission is often mounted within equipment racks that permit a high density of connections to be made in a small space. A high density of connections means that a large number of optical fiber cables will need to be routed to and from the equipment, also in a small space. While the high density of connections possible with optical fiber is one of the principal reasons for utilizing optical fiber in this sort of environment, organizing the large number of optical fiber cables connected to the equipment can be difficult. This difficulty most often arises with respect to the cross-connect or jumper cables connected to these telecommunications racks. Copper systems also experience similar cable management issues.

The outside plant or interfacility cables connected to such equipment are cables which by their nature do not require frequent disconnect or reconnect, and which are also bundled more densely, with multiple fibers being held within a single cable. In contrast, the cables connected to the front of these equipment racks are single fiber cables which may be disconnected or reconnected often in the course of normal use and configuration of the equipment. The higher number of individual cables and the need to be able to readily move connections require the provision of clear cable segregation, labeling and organization proximate to the front connections of these telecommunications installations.

SUMMARY OF THE INVENTION

One aspect of the present invention relates to a cable routing clip with a rear crosspiece and two clip arms defining an open-ended slot with two overlapping retaining members extending across the slot. Another aspect of the present invention relates to the shape of mounting tabs extending from the rear crosspiece opposite the clip arms for mounting the clip to a wall with rectangular slots. A further aspect of the present invention relates to a cable riser in which are mounted a plurality of cable routing clips defining a plurality of vertical cable paths.

A further aspect of the invention relates to a cable clip with cable segregator adapted for mounting in a wall having a plurality of slots for receiving telecommunications cables. A further aspect of the present invention relates to a cable clip with segregator which provides bend radius protection for cables passing through the clip. A still further aspect of the invention relates to a cable riser including cable clips with segregators mounted to one of the walls. A still further aspect of the present invention relates to a cable riser including cable clips with segregators mounted in one of the walls and plurality of cable routing clips mounted within the riser defining a plurality of vertical cable paths.

A further aspect of the present invention is a method for loading telecommunications cables entering a cable riser into vertical cable paths defined along the walls of the riser.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 8 is a front perspective view of a bridge mounting for the cable routing clip of FIG. 1.

FIG. 9 is a top view of the bridge mounting of FIG. 8.

FIG. 10 is a front perspective view of the wall structure for the bridge mounting of FIG. 8.

FIG. 12 is a bottom view of the cable clip and segregator of FIG. 11.

FIG. 13 is a top view of the cable clip and segregator of FIG. 11.

FIG. 14 is a side view of the cable clip and segregator of FIG. 11.

FIG. 18 is a detail view of the cable clip and segregator of FIG. 11, showing the area enclosed by circle 16 in FIG. 15.

DETAILED DESCRIPTION

Reference will now be made in detail to exemplary aspects of the present invention that are illustrated in the accompanying drawings. Wherever possible, the same reference numbers will be used throughout the drawings to refer to the same or like parts. A similar part in different embodiments will be assigned that same reference number with the addition of an apostrophe differentiate the embodiments.

Figure 1:
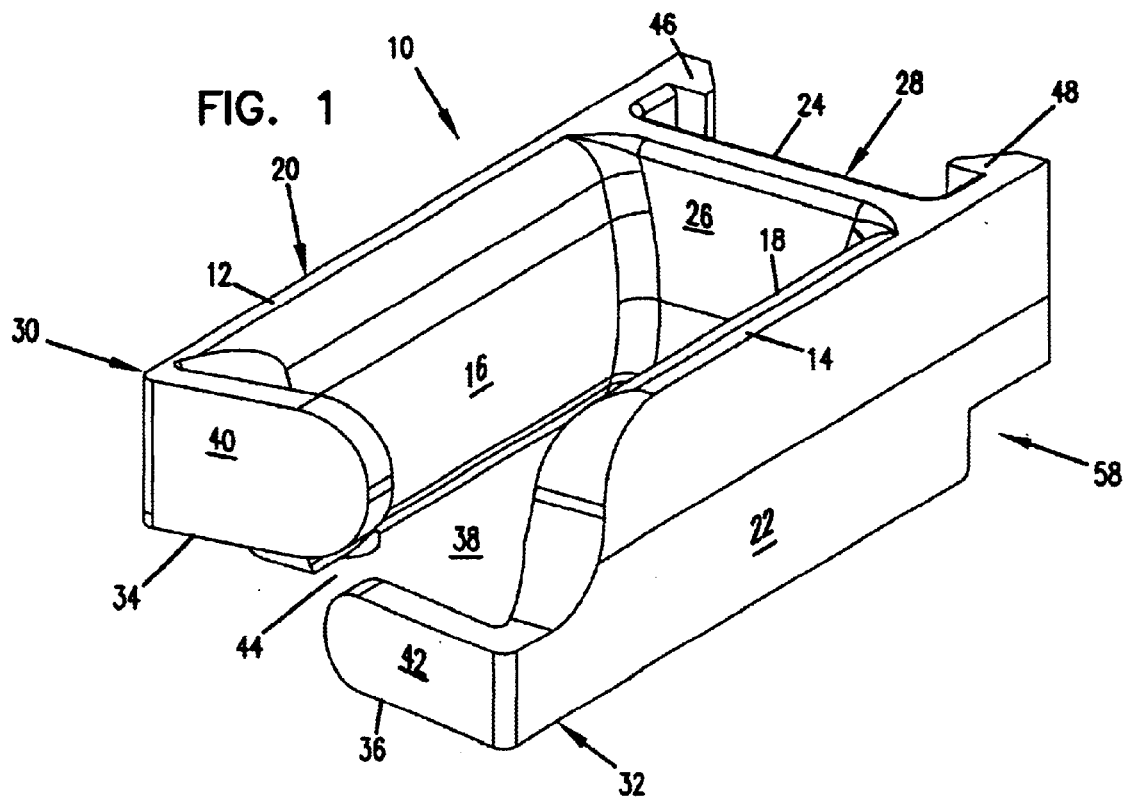
FIG. 1 is a front perspective view of a cable routing clip according to the present invention.
Figure 2:
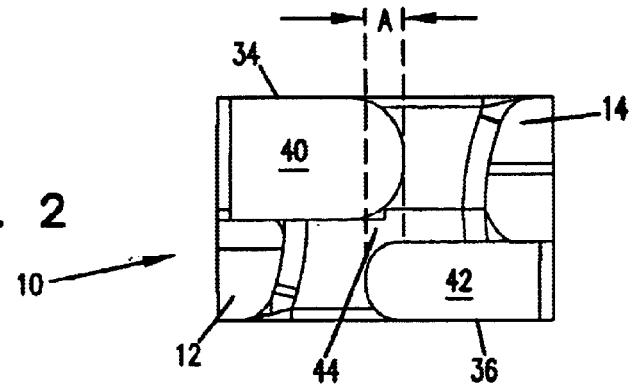
FIG. 2 is a front-end view of the cable routing clip of FIG. 1.
Figure 5:
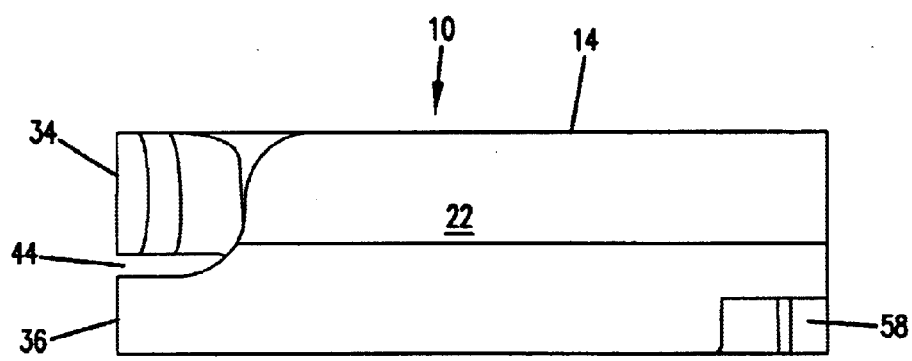
FIG. 5 is a second side view of the cable routing clip of FIG. 1.
Figure 3:
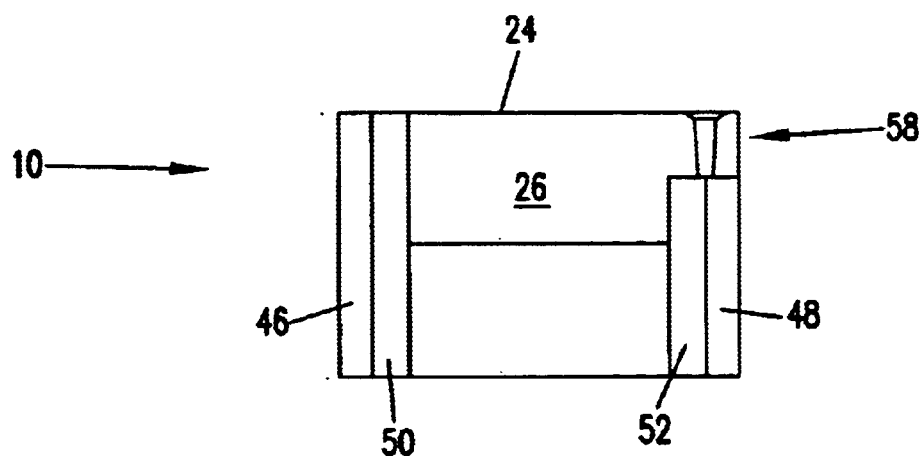
FIG. 3 is a rear end view of the cable routing clip of FIG. 1.
Figure 4:
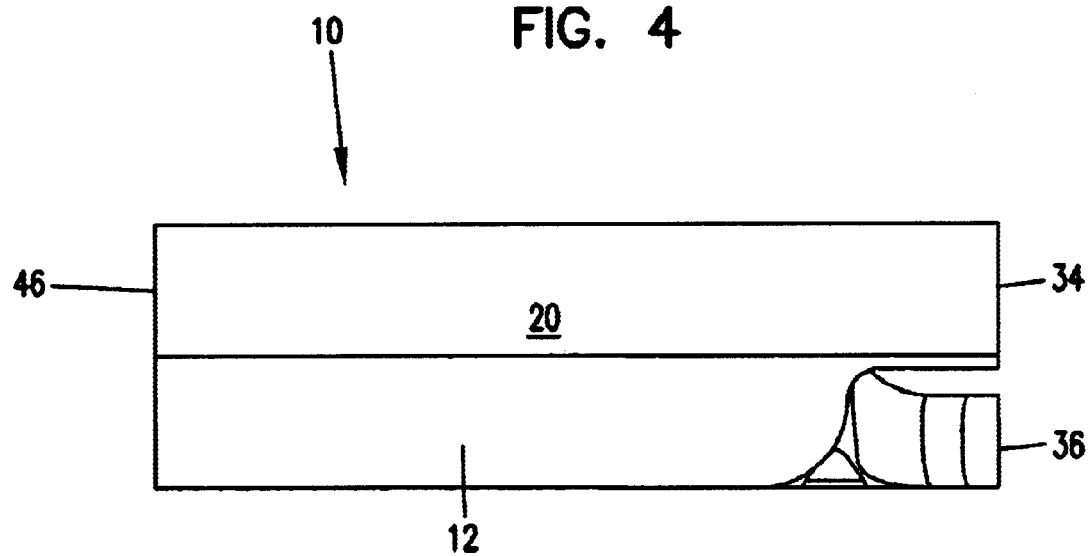
FIG. 4 is a first side view of the cable routing clip of FIG. 1.
Figure 6:
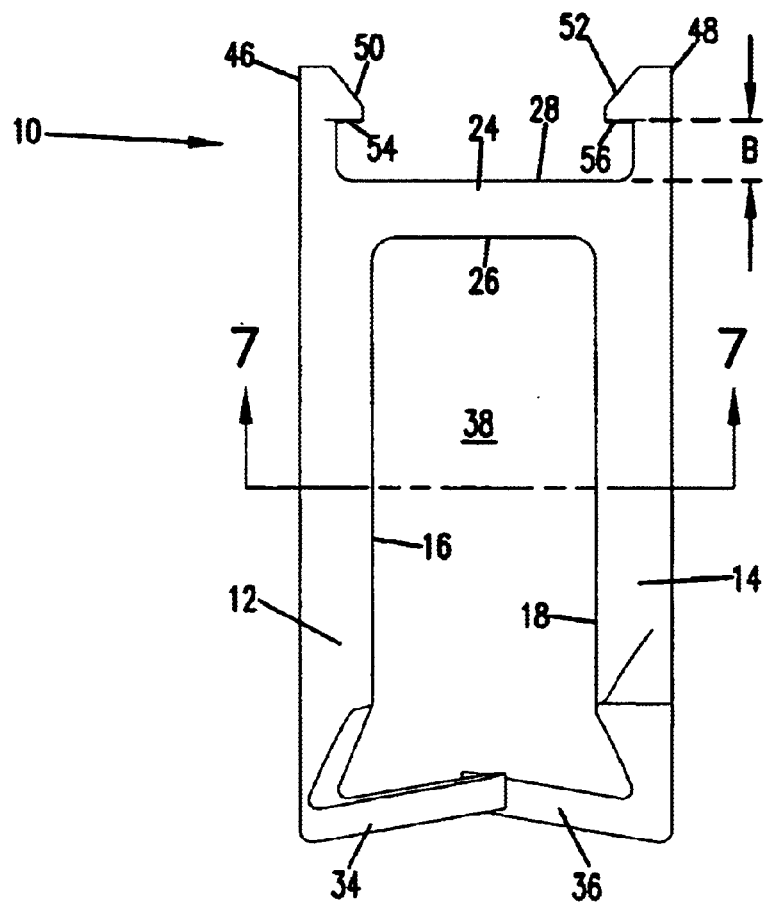
FIG. 6 is a top view of the cable routing clip of FIG. 1.

Referring now to FIGS. 1 through 10, a cable routing clip 10 for organizing cables is shown. Clip 10 is useful in a variety of structures, including a cable riser 200 discussed below, for managing telecommunications cables. Clip 10 includes two clip arms 12 and 14, which have inner faces 16 and 18, respectively and outer faces 20 and 22, respectively. A crosspiece 24 extends between the two clip arms 12 and 14, and crosspiece 24 has a front side 26 and a rear side 28. Clip arms 12 and 14 have outer ends 30 and 32, respectively. Retaining tabs 34 and 36 are mounted at outer ends 30 and 32 and extend across a slot 38 which defined by crosspiece 24, and clip arms 12 and 14. Retaining tabs 34 and 36 have outer faces 40 and 42. Outer faces 20 and 22 of clips arms 12 and 14, and outer faces 40 of retaining tab 34 are sized and shaped to receive indicia of the cables held within slot 38. Outer face 42 of retaining tab 36 may also be shaped to receive such indicia. Retaining tabs 34 and 36 cooperate to extend fully across the width of slot 38. As shown in FIG. 2, the retaining tabs actually overlap by an amount A. Retaining tabs 34 and 36 are less than the height of clip arms 12 and 14 and are offset from each other to form a gap 44. Cables may be placed within or removed from slot 38 by passing the cables through gap 44. Clip 10 is made of a resilient, deformable material so that cables that might have a diameter or size greater than the width of gap 44 can still be inserted into slot 38 through gap 44. The overlap A of retaining tabs 34 and 36 is sufficient to permit some outward deformation of clip arms 12 and 14 and still have retaining tabs 34 and 36 extending across slot 38. In FIG. 6, retaining tabs 34 and 36 are shown angled slightly in toward slot 38. Cable movement within slot 38 may cause a cable to apply pressure to the inside of retaining tabs 34 or 36. Biasing the tabs inward toward slot 38 will aid the tabs in resisting this pressure and maintain closure of slot 38 so that no cable are allowed to escape.

Extending longitudinally from rear side 28 of crosspiece 24 are mounting tabs 46 and 48, adapted for mounting clip 10 to a wall of a telecommunications equipment rack, a cable riser, or other suitable location. Mounting tabs 46 and 48 are generally parallel with clip arms 12 and 14 and generally extend co-linearly with clip arms 12 and 14, respectively. Mounting tabs 46 and 48 are designed to fit into vertical tabs slots in sheet metal walls, such as shown in FIGS. 20 through 23, discussed below. Tabs 46 includes a ramped face 50 and a locking notch 54, which is spaced apart from rear side 28 by a distance B. Tab 48, ramped face 52 and locking notch 56 are similarly configured. Distance B is based upon the thickness of the wall into which clip 10 will be inserted. Thicker walls will require a larger distance B and thinner walls will permit a smaller distance B. When tabs 46 and 48 are inserted into mounting slots in a wall, ramped faces 50 and 52 press against the inner side of the mounting slots to force tabs 46 and 48 to be deformed outward. After the ramped faces have passed through the mounting slots, tabs 46 and 48, being made of resilient, deformable material return to their original shape and locking notches 54 and 56 engage the opposite side of the wall to hold clip 10 in place with face 28 against the wall. In the embodiment shown in FIGS. 1 through 7, mounting tab 48 has a recess 58, so that tab 48 does not extend to the same height as tab 46. In situations where the insertion orientation of clip 10 needs to be fixed, the mounting slot for receiving tab 48 can be made shorter than the mounting slot for receiving tab 46, thus forcing clip 10 to mounted in the desired orientation.

Figure 7:
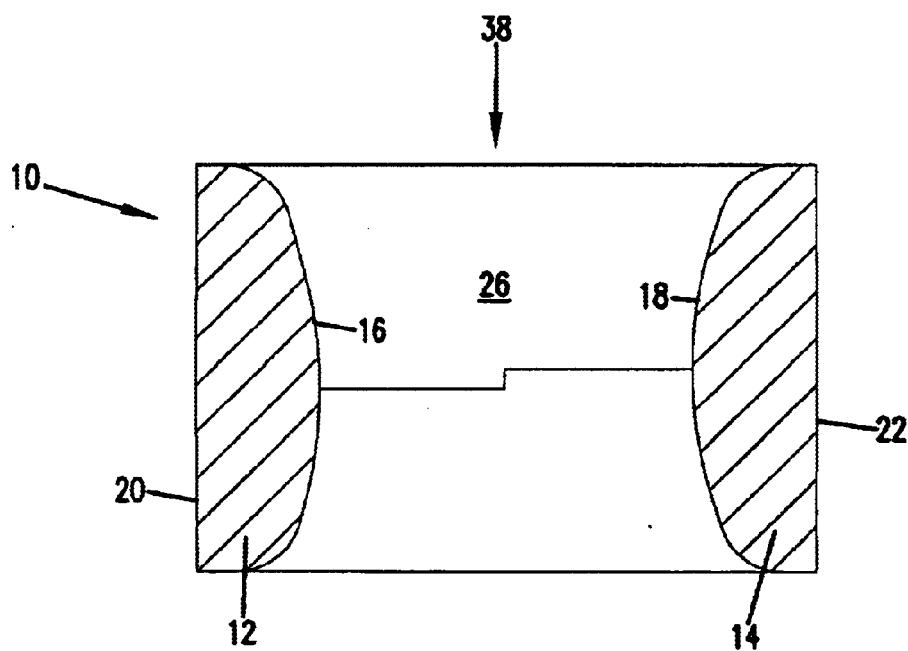
FIG. 7 is a cross-sectional view of the cable routing clip of FIG. 1, taken at line 7—7 in FIG. 6.
Figure 11:
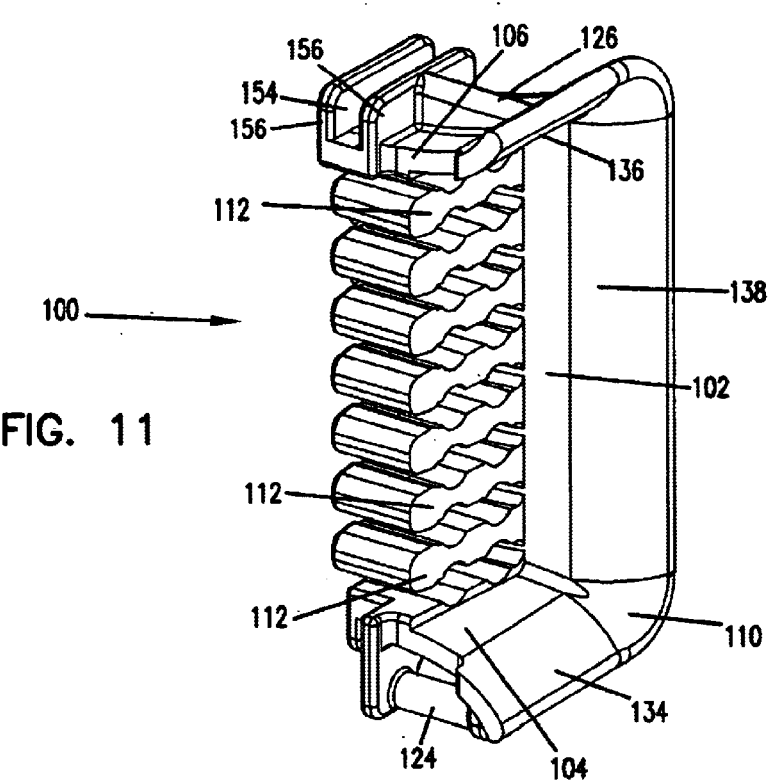
FIG. 11 is a perspective view of a cable clip and cable segregator according to the present invention.

Referring now to FIG. 7, a cross-section of clip arms 12 and 14 is shown. Cables passing through slot 38 may be directed to one side or the other after they pass through the slot. To prevent violation of bend radius rules for these cables, inner faces 16 and 18 of clip 10 are curved.

Referring now to FIGS. 8 through 10, an alternative bridge mounting approach for clip 10 is shown. In certain installations, it may be necessary or desirable to mount clips to the front of a wall without having the mounting tabs protruding beyond the rear of the wall. A wall segment 70 is shown, with a front face 60 to which a clip 10 will be mounted. A bridge 62 is formed in the wall 70, protruding from the front face 60 and having mounting slots 64 and 66 on either side. Mounting tabs 46 and 48 are inserted into slots 64 and 66 as described above and locking notches 54 and 56 engage the rear of bridge 62. Bridge 62 extends far enough out from front 60 of wall 70 so that mounting tabs 46 and 48 do not protrude beyond rear face 68 when clip 10 is mounted on wall 70. Mounting slots 64 and 66 shown in FIGS. 8 through 10 are not sized to force the insertion of clip 10 in a particular orientation.

Figure 15:
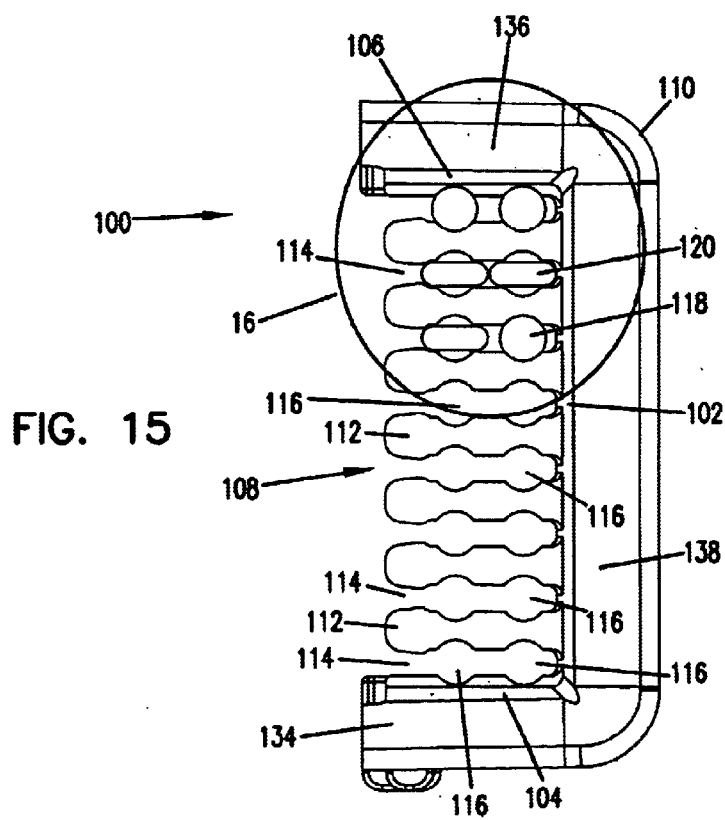
FIG. 15 is a front view of the cable clip and segregator of FIG. 11.
Figure 17:
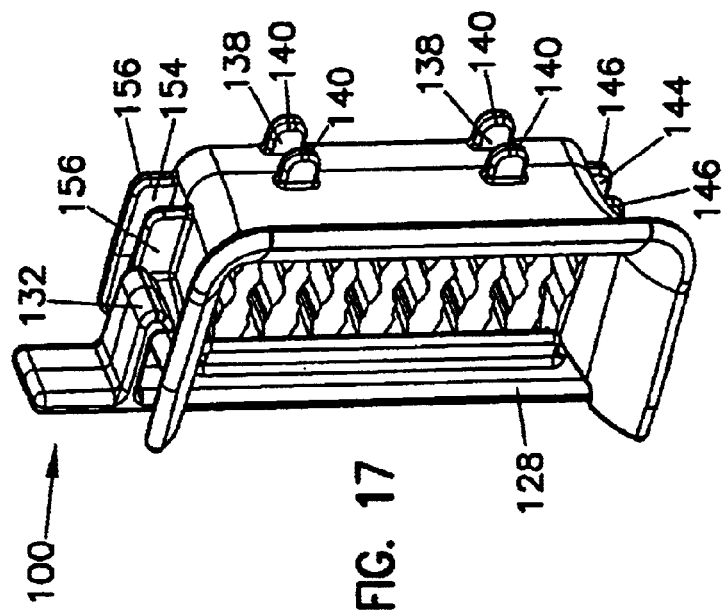
FIG. 17 is a front view of the cable clip and segregator shown in FIG. 16 with the gate in a closed position.
Figure 16:
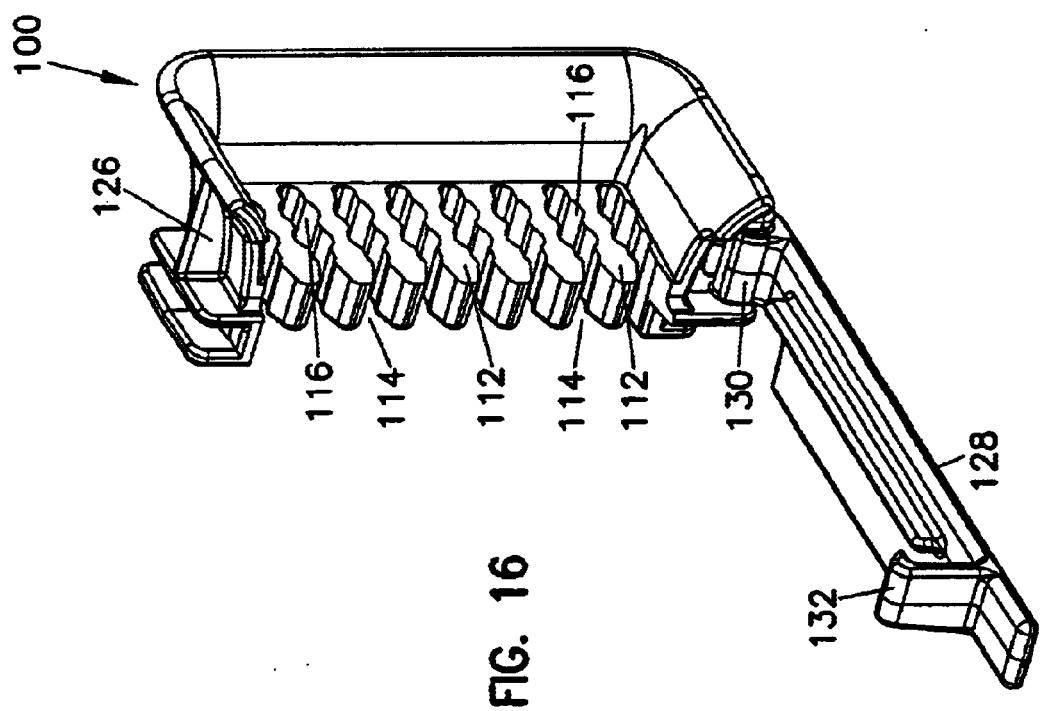
FIG. 16 is a front perspective view of an alternative embodiment of a cable clip and segregator with a gate shown in an open position.

Referring now to FIGS. 11 through 19, the details of a further cable clip 100 with cable segregator 101 are shown. Clip 100 is useful on a variety of structures, including riser 200, for managing cables, as will be discussed below in greater detail. Clip 100 includes a side 102 and two ends, 104 and 106. Side 102 and ends 104 and 106 combine to form an open sided housing 110 defining an area 108 within the housing. Into area 108 extend a series of fingers 112 from side 102, which define a series of cable slots 114 between them. A slot 114 is also defined between a finger 112 and end 104 and a finger 112 and end 106. As shown in the FIGS. a total of seven fingers 112 cooperate with ends 104 and 106 to form a total of eight cable slots 114. Each cable slot 114 includes a pair of widened cable holding openings 116, giving clip 100 a capacity of sixteen cables. Cable slots 114 are sized so that a ribbon optical fiber cable 120 can be inserted as shown in FIGS. 15 and 16. Preferably, openings 116 are also sized and shaped to hold a round 3 mm optical fiber cable 118. While slots 114 are smaller in width than the diameter of cable 118, clip 100 is made of a resilient, deformable material which, in cooperation with the cover of cable 118 will permit slots 114 to expand enough to permit the insertion of cable 118. To prevent ribbon cable 120 from accidentally escaping from slot 114, lip 122 on finger 112 provides an entrance to slot 114 which is slightly narrower than the width of cable 120. To further prevent accidental escape of cables from slots 114, a gate pivot 124 and a gate latch 126 are provided, as shown in FIGS. 16 and 17. A gate 128 with a hinge 130 that pivots about pivot 124 and a catch 132 which releasably latches to latch 126 and which is made of a deformable, resilient material and which extends along the ends of fingers 112 to close off slots 114, will serve prevent accidental cable escape.

Figure 18A:
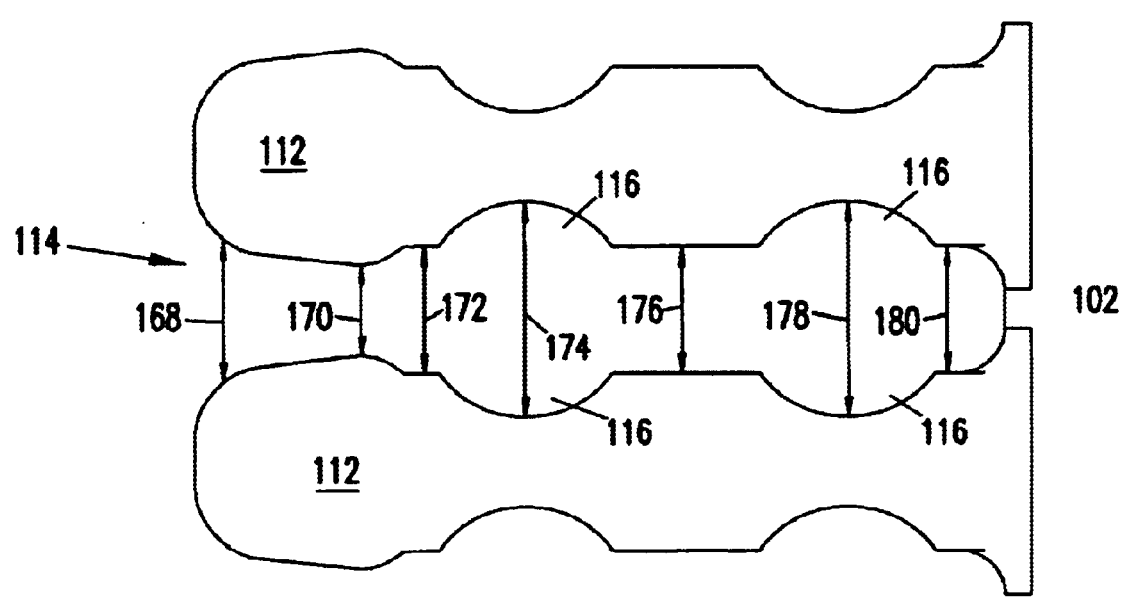
FIG. 18A is a detail view of a cable slot of the cable clip and segregator of FIG. 11.

FIG. 18A shows slots 114 in more detail. Within slot 114 are regions of varying width. Beginning at the open end of slot 114, opposite side 102, a width 168 provides an entry for cables being inserted into slot 114. Moving toward side 102, the width of slot 114 then tapers to width 170, defined by the separation of opposing lips 122. Continuing toward side 102, the width expands to a nominal width 172. Slot 114 then includes opposing openings 116, defining an expanded width 174. Continuing again in the direction of side 102, the slot returns to a nominal width 176 before expanding again with opposing openings 116 defining an expanded width 178. Between the last set of opposed openings 166 and side 102, slot 114 returns to a nominal width 180

Also included as part of housing 110 may be trumpet flares 134, 136 and 138 extending from end 104, end 106 and side 102, respectively. These trumpet flares serve as radius protection devices for cables 118 and 120 extending through slots 114 if the cables are required to change direction after they pass through slots 114.

Figure 19:
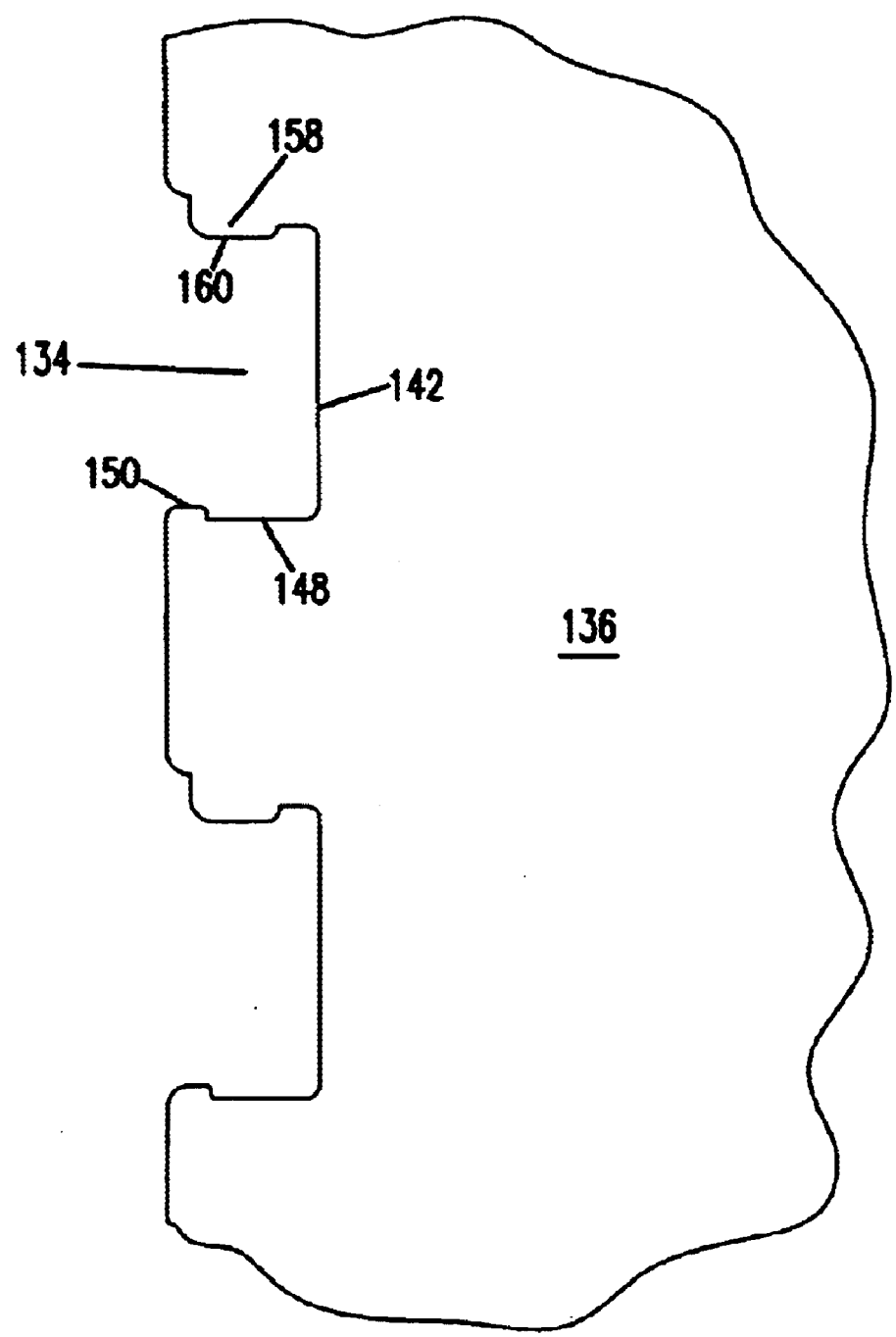
FIG. 19 is a profile of two mounting cutouts in a riser wall for mounting the cable clip and segregator of FIG. 11.
Figure 20:
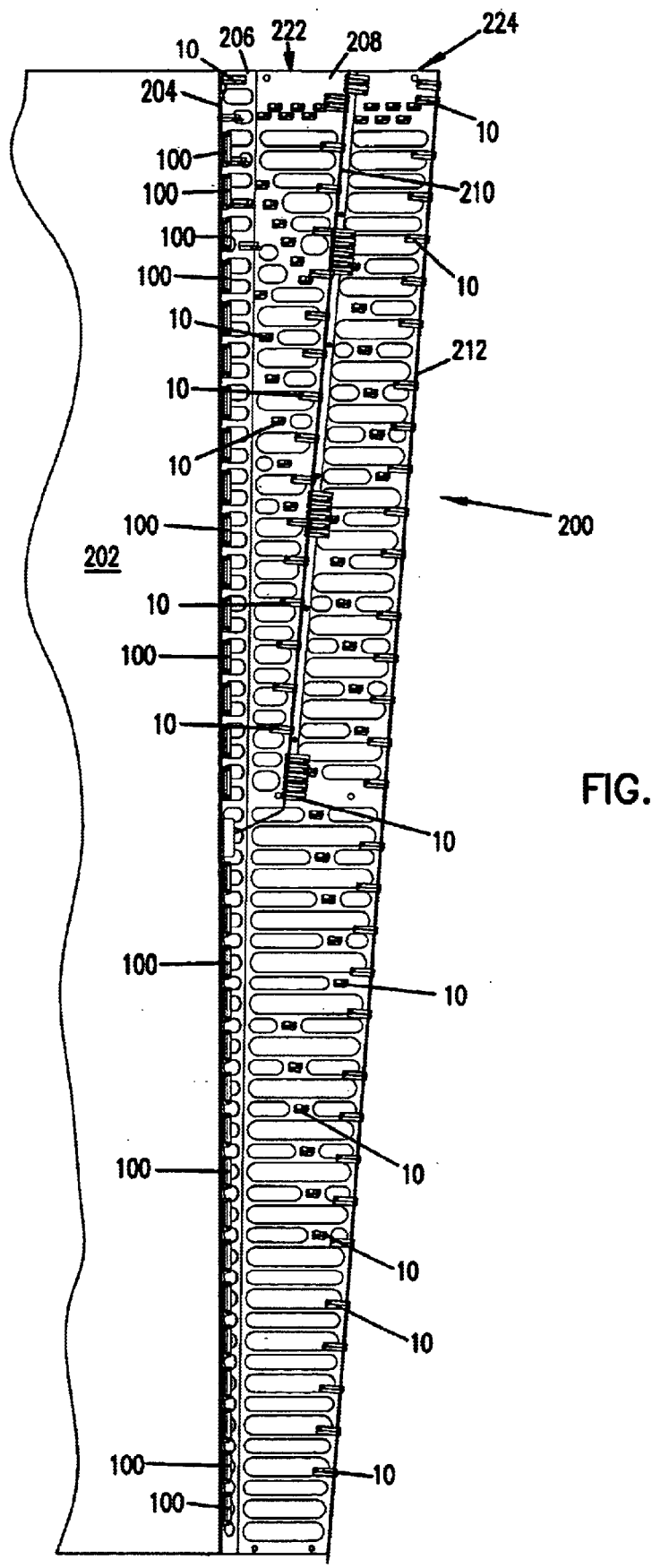
FIG. 20 is a front view of a cable riser according the present invention mounted to the side of a telecommunications equipment rack.

Clip 100 is adapted for mounting on a wall of a telecommunications equipment rack or to the wall of a cable riser attached to such a rack. This sort of installation is also shown in FIGS. 20 through 23, described below. FIG. 19 shows the shape of a cutout 134 in cable riser wall 136 in which a clip 100 could be mounted. A rear groove 138 in clip 100 is defined by pairs of rear tabs 140 for receiving a rear edge 142 of cutout 134. A lower groove 144 is defined by a pair of walls 146 receives a lower edge 148 of cutout 134, and a lower recess 152 with an end wall 164 is provided at the front end of groove 144 to receive a lower tab 150. An upper groove 154 is defined by a pair of walls 156 receives an upper edge 158 of cutout 134. From upper edge 158 extends an upper tab 160 which is received in an upper recess 162 formed in the bottom of upper groove 154. To mount a clip 100 to a wall 136 in a cutout 134, the following procedure is used: open gate 130; holding clip 100 so that rear groove 138 is parallel to wall 136, angle end 106 of clip 100 into cutout 134 so that upper edge 158 and upper tab 160 engage upper groove 154 and upper recess 162; apply pressure to ends 104 and 106 of clip 100 to slightly deform the ends toward each other; pivot lower end 104 into cutout 134 so that lower edge 148 and rear edge 142 are engaged by lower groove 144 and rear groove 138, respectively; with clip 100 still slightly deformed by pressure on ends 104 and 106, lower tab will move past end wall 164 and into recess 152; and releasing the pressure on ends 104 and 106 to allow clip 100 to regain its default shape and have end wall 164 engage lower tab 150 to hold clip 100 within cutout 134.

Figure 21:
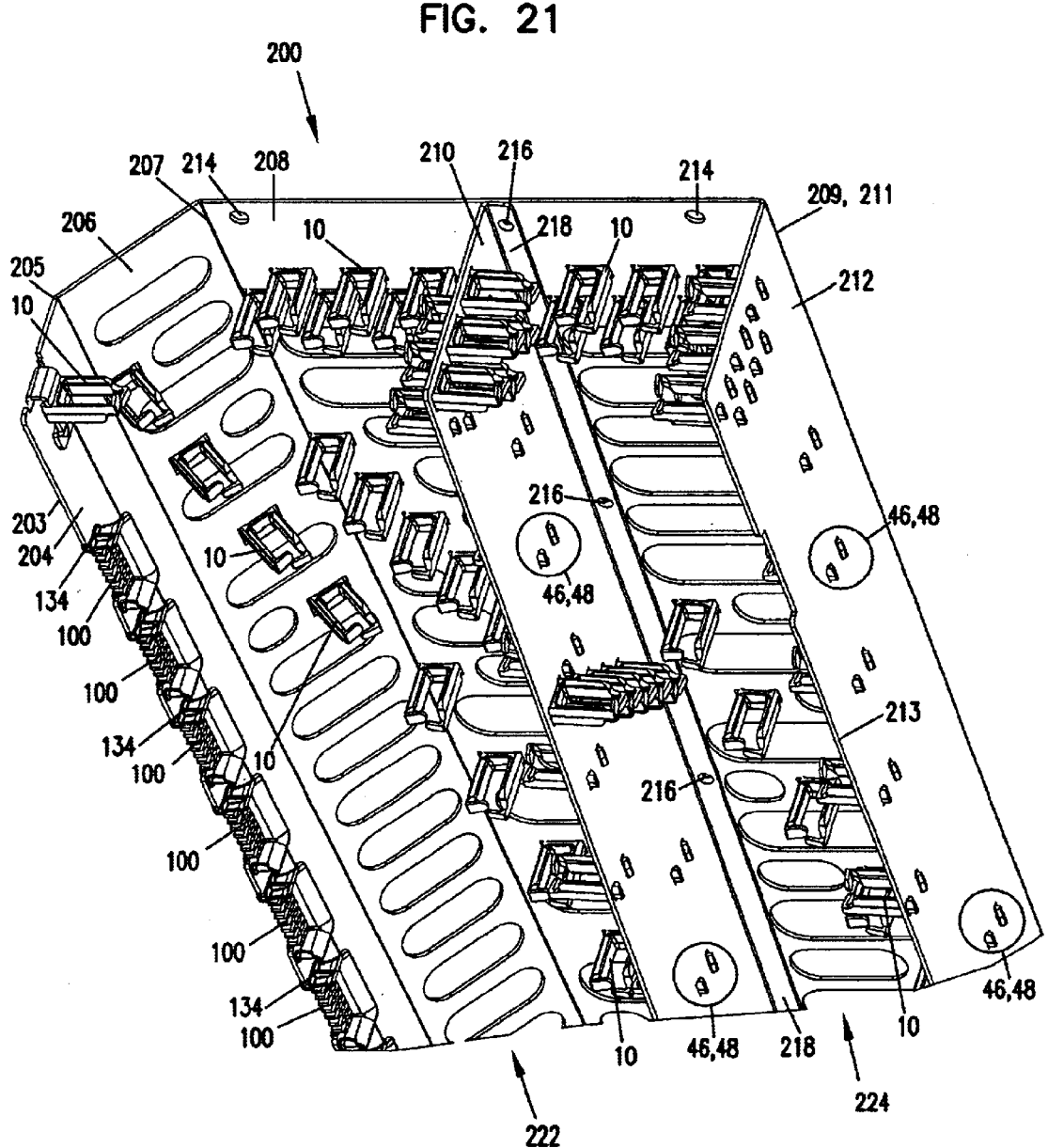
FIG. 21 is a top perspective view of the cable riser of FIG. 20 with the 32 individual cable paths indicated.
Figure 22:
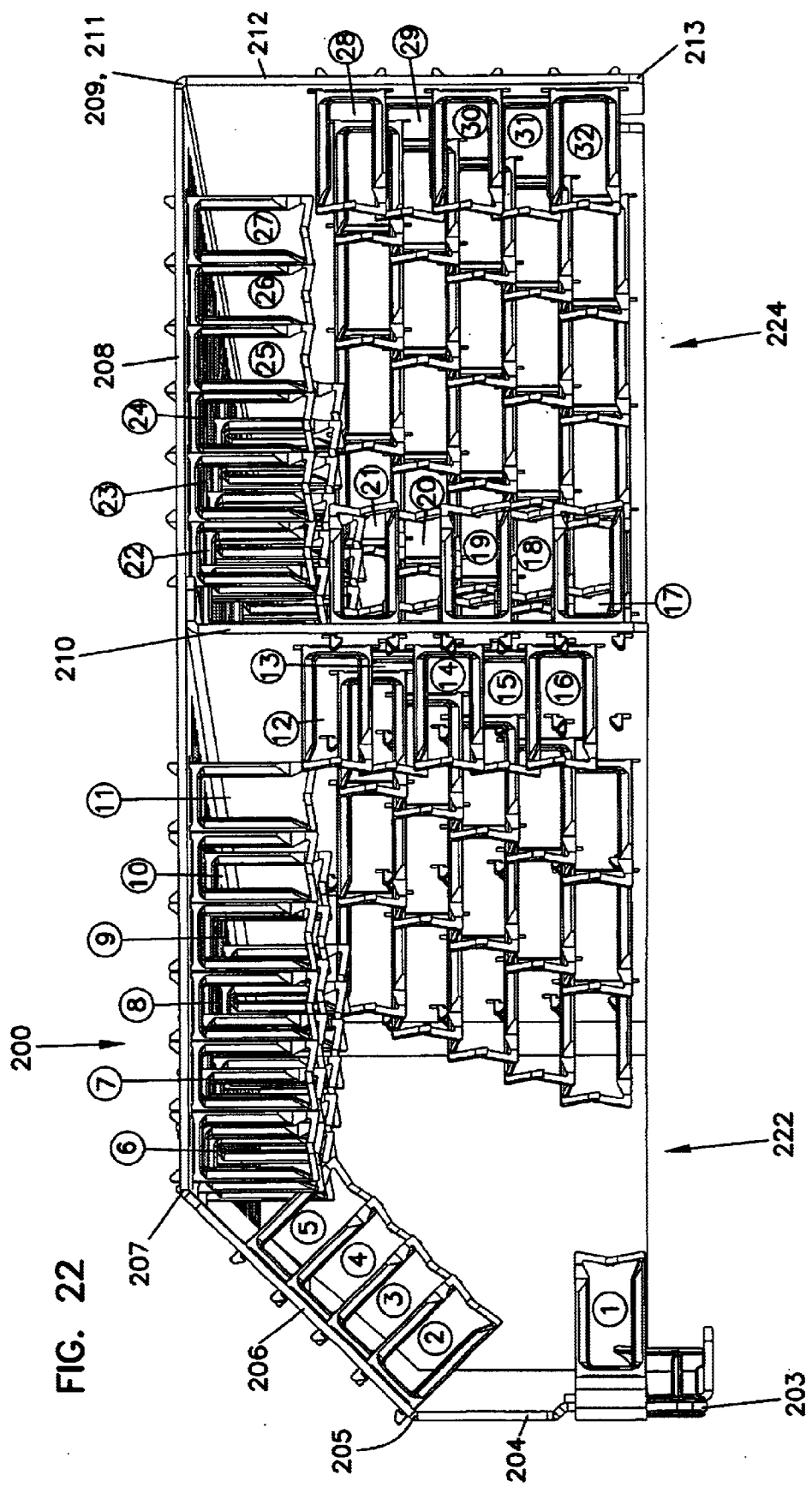
FIG. 22 is a close-up perspective view of the top of the cable riser of FIG. 20.

Referring now to FIGS. 20 through 25, a cable riser 200 with cable routing clips 10 and cable clips 100 with segregators 101 is shown. Riser 200 is attached to a telecommunications equipment rack 202, in which may be mounted a wide variety of telecommunications equipment which have a large number of ribbon cables 120 or 3 mm cables 118 attached to them. Riser 200 as shown is designed to work with a equipment rack 202 containing a total of 32 cable connection modules, with each module including up to 16 optical fiber connections and having up to 16 optical fiber cables exiting from each module into riser 200. A clip 100 is provided along an inner wall 204 of riser 200 for each module in rack 202. Each of the plurality of clips 100 is mounted within an opening 134 in a first edge 203 of inner wall 204. The trumpet flares of these clips 100 serve to provide bend radius protection to the cables exiting rack 202 through clips 100 into riser 200 as these cables transition from horizontal passage within rack 202 to vertical passage within riser 200. Riser 200 is composed of inner wall 204, a rear angle wall 206, a rear wall 208, an intermediate bulkhead 210 and an outer wall 212. Inner wall 204 is a first wall defining an open fronted channel of riser 200. Inner wall 204 is connected to rear wall 208 by rear angle wall 206, which extends from a second edge 205 of inner wall 204 to a first edge 207 of rear wall 208. Inner wall 204 and rear wall 208 are generally perpendicular to each other, as can be seen in FIG. 22. Rear wall 208 is connected to outer wall 212 alone a second edge 209 of rear wall 208 which is also a second edge 211 of outer wall 212. Outer wall 212 also includes a first edge 213 and extends generally perpendicular to rear wall 208. Rear wall 208 and outer wall 212 are second and third walls which cooperate with the first wall to define the open fronted channel of riser 200.

Figure 24:
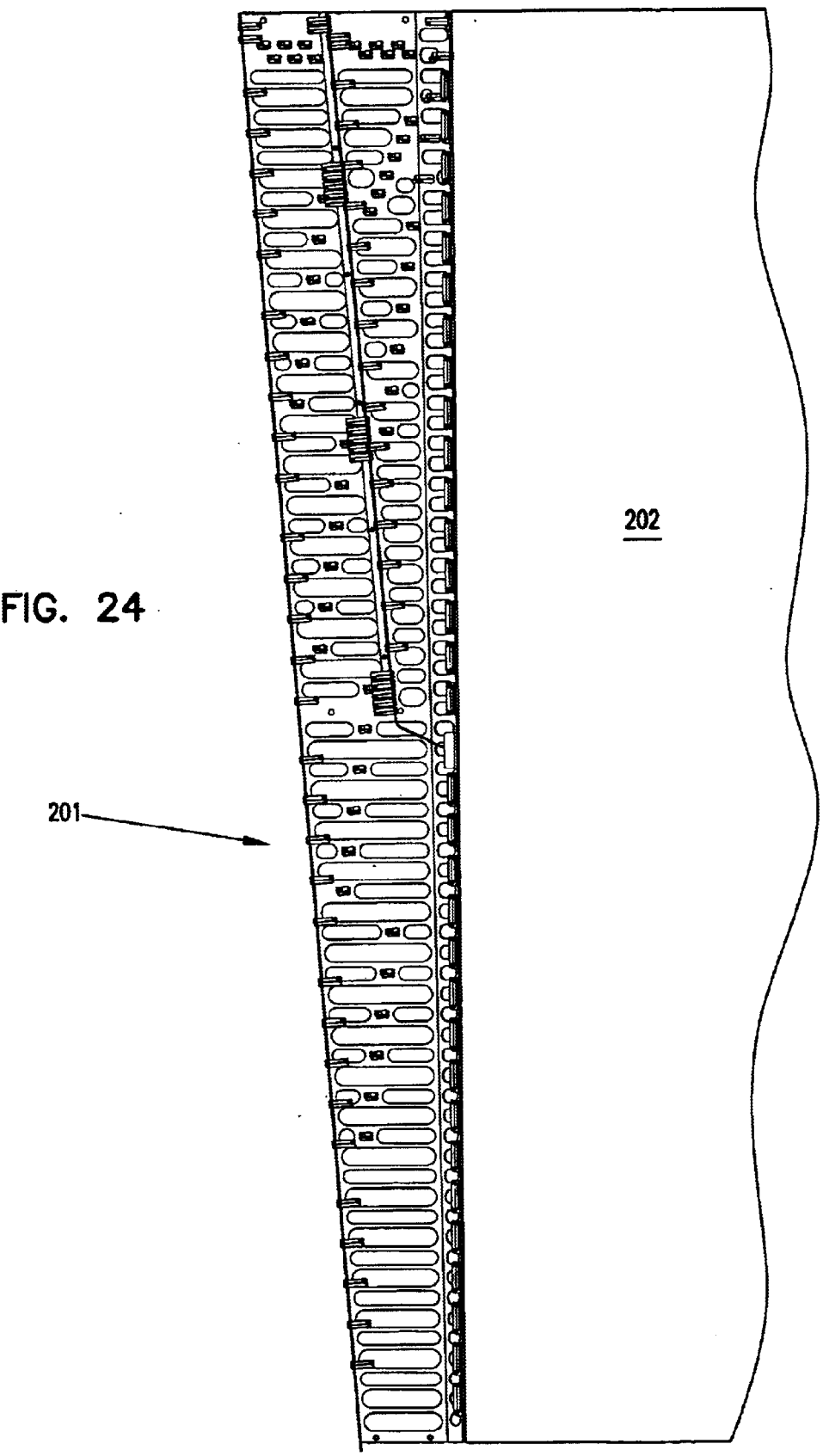
FIG. 24 is a front view of alternative embodiment of a cable riser according to the present invention.

In FIG. 21, mounting tabs 46 and 48 of clips 10 can be seen extending through bulkhead 210 and outer wall 212. A series of holes 214 through rear wall 208 allow riser 200 to be mounted adjacent a rack 202 using screws or other similar fasteners. A series of holes 216 through flange 218 of bulkhead 210 and also extending through rear wall 208 allow bulkhead 210 to be mounted within riser 200 using screws, bolts or similar fasteners. As shown in FIG. 24, riser 201 is a minor image of riser 200 for mounting on the opposite side of rack 202.

Clips 10 are mounted within riser 200 so as to provide a distinct cable path 220 to each set of up to 16 cables extending through each of the clips 100. A total of 32 cables paths 220, each capable of handling up to 16 cables are defined, as shown in FIG. 22. Each cable path 220 is indicated by a circled number associated with the top most clip 10 in that cable path. The numbers for each cable path correspond to numbers assigned to each clip 100, with the topmost clip 100 labeled 1 and the bottommost clip 100 labeled 32, as shown on FIG. 23. Sixteen cable paths 220 are located within the inner channel 222, defined by inner wall 204, angled wall 206, rear wall 208, and bulkhead 210, providing cable routing and organization to cables exiting from the topmost sixteen clips 100 mounted on inner wall 204. Sixteen additional cable paths 220 are located within outer channel 224, defined by bulkhead 210, rear wall 208 and outer wall 212, providing cable routing and organization for cables exiting the bottommost sixteen clips 100 mounted on inner wall 204.

Figure 23:
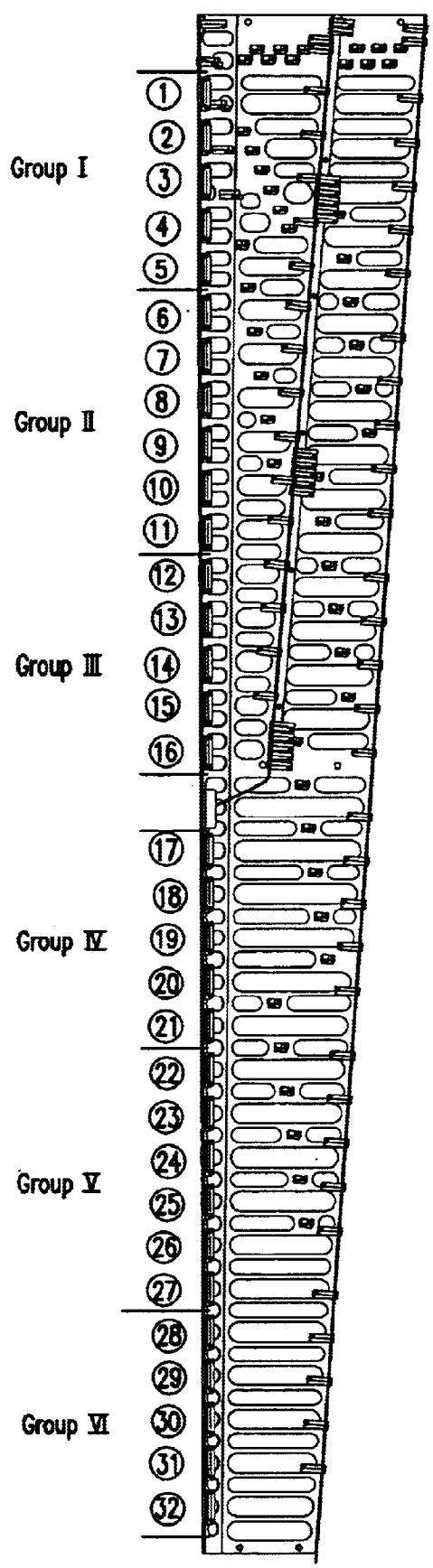
FIG. 23 is a front view of the cable riser of FIG. 20 with the cable clips and segregators 100 numbered and the six groups of clips 100 indicated.
Figure 25:
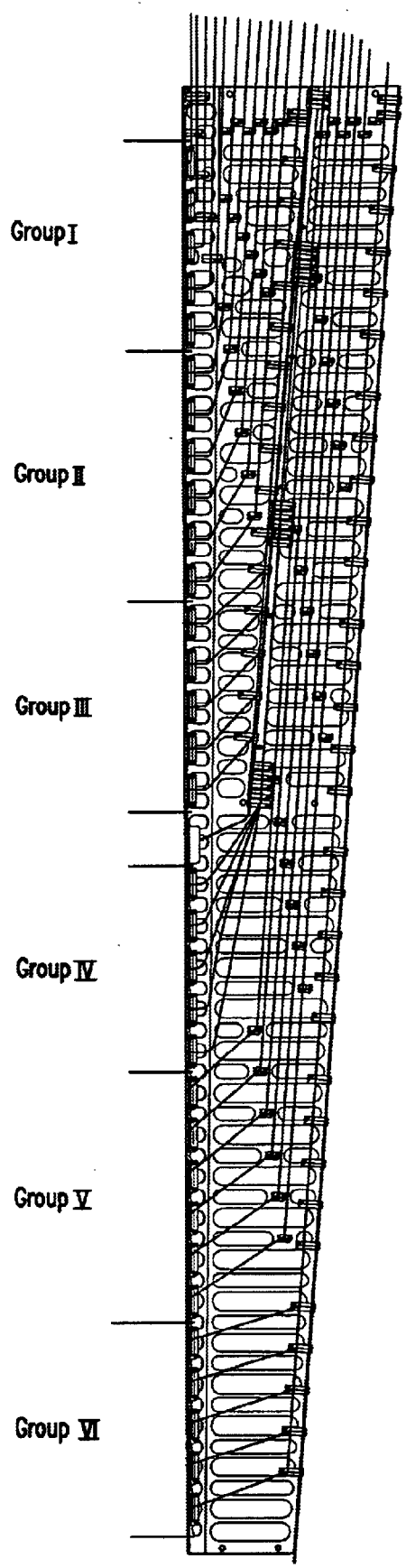
FIG. 25 is a front view of the cable riser of FIG. 20 showing cable loading according to the present invention.

Clips 100 are in one of six groups, as shown in FIGS. 23 and 25. The groupings of clips 100 correspond to the location of the cable pathway for each clip 100 as defined by clips 10 mounted in riser 200. The first five clips 100, numbered 1 through 5, are in Group I and cables exiting from this group of clips feed into paths 220 numbered 1 through 5, which are mounted on inner wall 204 and on angled wall 206. Group II includes the next 6 clips 100, numbered 6 through 11, and the cables from these clips feed into paths 220 numbered 6 through 11, which are mounted on rear wall 208 within inner channel 222. Group III includes the clips 100 numbered 12 through 16 and cables from these clips feed into paths 220 numbered 12 through 16, which are mounted on bulkhead 210 within inner channel 222. Group IV includes clips 100 numbered 17 through 21 and cables from the clips feed into paths 220 numbered 17 through 21 mounted on bulkhead 210 within outer channel 224. Group V includes clips 100 numbered 22 through 27 and cables from the clips feed into paths 220 numbered 22 through 27 mounted on rear wall 208 within outer channel 224. Group VI includes clips 100 numbered 28 through 32 and cables from the clips feed into paths 220 numbered 28 through 32 mounted on outer wall 212 within outer channel 224.

The pattern for loading cable would generally be counter clockwise for a riser 200 and clockwise for a riser 201. As shown in the FIGS. path 220 numbered 32 will hold the cables from clip 100 numbered 32. Clip 100 numbered 32 is the lowest mounted clip 100 in riser 200 and path 220 numbered 32 is the furthest clockwise-located path 220 in riser 200. Clip 100 numbered 31 is the next lowest mounted clip 100 and the cable from this clip will be held within path 220 numbered 31, located counterclockwise from path 220 numbered 32 within outer channel 224 of riser 200. Moving to the next highest mounted clip 100, up to clip 100 numbered 17, the cables from each successive numbered clip will be held by the next counterclockwise located cable path within outer channel 224. Moving up to clip 100 numbered 16, the cables from this clip will pass into most clockwise mounted path 220 numbered 16 within inner channel 222. Moving up to clip 100 numbered 15, the cables from this clip will be held by the next counterclockwise mounted path 220 numbered 15. Moving to the next highest mounted clip 100, up to clip 100 numbered 1, the cables from each successive numbered clip will be held by the next counterclockwise located cable path within inner channel 222. The same cable loading pattern can be applied within riser 201, except that the cables from each successive higher mounted clip 100 feeding into a particular channel will be held by the next successive clockwise mounted path 220.

With the potential of 512 total cables passing through riser 200, some manner of coding the clips 10 which combine to make up the 32 different paths 220 is desirable. The maximum number of paths 220 within each group of clips 100 is six. Therefore, if six distinctly marked or colored versions of clip 10 are provided, each path 220 within riser 200 can be uniquely identified by a combination of color or marking, designation of inner or outer channel, and which wall within the channel the clips are mounted on. For example, a series of black clips 10 along outer wall 212 in the outer channel 224 would define path 220 for routing the cables from clip 100 numbered 28. White clips 10 along bulkhead 210 in inner channel 222 would define path 220 for routing cables from clip 100 numbered 15. Alternatively, indicia signifying which path 220 a clip 10 belongs to could be placed on front face 40, first outer face 20 or second outer face 22, depending on how the clip is mounted within the riser, so that the indicia could be easily seen by a person in front of the riser.

If higher densities of cabling are required for a particular telecommunications equipment rack, riser 200 could include more than one intermediate bulkhead 210 and thereby provide a greater number of channels and thereby of cable paths 220. Alternatively, if the density of cabling for an equipment rack is not as high, bulkhead 210 could be removed from riser 200 and the number of paths 220 reduced. The coding scheme for clips 10 described above is adaptable to both higher and lower density alternatives of riser 200.

With regard to the foregoing description, it is to be understood that changes may be made in detail, especially in matters of the construction materials employed and the shape, size and arrangement of the parts without the scope of the present invention. It is intended that the specification and depicted aspects be considered exemplary only, with a true scope and spirit of the invention being indicated by the broad meaning of the following claims.

What is claimed is:

1. A cable clip with a cable segregator comprising:
   an outer housing including a first end with an inner portion and an outer portion, a second end with an inner portion and an outer portion, and a side with an inner portion and an outer portion, the inner portions of the first end, the second end and the side defining an open sided space;
   a plurality of members extending from the inner portion of the side into the open space defining a plurality of open ended cable slots within the open space, the cable slots having a depth and a width;
   the members being spaced apart so that the width of the cable slots is sized to receive telecommunications cable; and
   the outer portions of the first end, the second end and the side including first, second and rear grooves, respectively, for receiving a first edge, a second edge and a rear edge, respectively, of a mounting opening, the first and second grooves having recesses for receiving a tab formed in each of the first and second edges of the mounting opening.

2. The cable clip of claim 1, wherein the depth of the slots is sized to receive two telecommunications cables in each slot.

3. The cable clip of claim 2, wherein the width of the slots varies from the nominal width along the depth, with a narrower than nominal portion at the open end of the slot, and a plurality of wider than nominal portions along the depth of the slot.

4. The cable clip of claim 3, wherein the number of slots defined within the open space is eight.

5. The cable clip of claim 4, wherein the first end includes a pivot and the second end includes a catch, and a gate engages and rotates about the pivot and is adapted to releasably engage the catch, the gate covering the open end of the slots when in a closed position engaging the catch and being movable to an open position upon disengaging the catch.

6. A cable riser comprising:
   a first wall having a front edge, a rear edge, a first side and a second side;
   a second wall generally perpendicular to the first wall having a first edge, a second edge, a first side and a second side, and being connected along the first edge to the rear edge of the first wall;
   a third wall generally perpendicular to the second wall having a first edge, a second edge, a first side and a second side, and the second edge of the third wall being connected to the second edge of the second wall;
   the first side of the first wall, the first side of the second wall and the first side of the third wall cooperating to define a channel; and
   the front edge of the first wall having a plurality of mounting openings adapted to mount cable clips with segregators to organize and hold telecommunications cables and allow the cables to pass into the channel of the cable riser;
   the cable clips with segregators including an outer housing with a first end with an inner portion and an outer portion, a second end with an inner portion and an outer portion, and a side with an inner portion and an outer portion, the inner portions of the first end, the second end and the side defining an open sided space;
   the outer portions of the first end, the second end and the side of the cable clips having upper, lower and rear grooves, respectively, and the mounting openings in the front edge of the first wall have upper, lower and rear edges, the upper, lower and rear grooves receiving the upper, lower and rear edges, respectively, of the cutout, and the upper and lower grooves having recesses for receiving a tab formed in each of the upper and lower edges of the cutout.

7. The cable riser of claim 6, wherein the cable clip with cable segregator further comprises:
   a plurality of members extending from the inner portion of the side into the open space defining a plurality of open ended cable slots within the open space, the cable slots having a depth and a width;
   the members being spaced apart so that the width of the cable slots is sized to receive telecommunications cable; and the outer housing including a trumpet flare to provide bend radius protection for telecommunications cables received in the slots.

8. The cable riser of claim 7, wherein the depth of the slots in the cable clips is sized to receive two telecommunications cables in each slot.

9. The cable riser of claim 8, wherein the width of the slots in the cable clip varies from the nominal width along the depth, with a narrower than nominal portion at the open end of the slot, and a plurality of wider than nominal portions along the depth of the slot.

10. The cable riser of claim 9, wherein the number of slots in the cable clip defined within the open space is eight.

11. The cable riser of claim 10, wherein the first end of the cable clip includes a pivot and the second end of the cable clip includes a catch, and a gate engages and rotates about the pivot and is adapted to releasably engage the catch, the gate covering the open sided space in the cable clip when in a closed position engaging the catch and being movable to an open position upon disengaging the catch.

12. A cable riser comprising:
a first wall having a front edge, a rear edge, a first side and a second side;
a second wall generally perpendicular to the first wall having a first edge, a second edge, a first side and a second side, and being connected along the first edge to rear edge of the first wall;
a third wall generally perpendicular to the second wall having a first edge, a second edge, a first side and a second side, and being connected to the second edge of the second wall along the second edge to the second edge of the second wall;
the first side of the first wall, the first side of the second wall and the first side of the third wall cooperating to define a channel;
the front edge of the first wall having a plurality of mounting openings and a plurality of cable clips with segregators mounted in the mounting openings to permit cables to pass into the channel;
a plurality of cable routing clips mounted to the first side of the first wall, the first side of the second wall and the first side of the third wall within the channel, the clips cooperating to define a plurality of generally vertical cable paths within the channel; and
each of the cables passing through the cable clips with segregators in the front edge of the first wall being held within one of the plurality of cables paths inside the riser.

13. The cable riser of claim 12, wherein the number of cable clips with segregators and the number of cable paths provided by the cable routing clips within the riser are equal.

14. A method of loading cables into a cable riser comprising:
providing a telecommunications equipment rack with vertically spaced apart cable connection locations, an cable riser with walls defining a cable channel mounted adjacent to the rack, a plurality of cables attached to the cable connection locations within the rack, the cables exiting from the rack through a side wall of the rack adjacent to the cable riser and entering the cable riser through a plurality of vertically spaced apart openings in a wall of the riser, the riser having a plurality of cable paths defined within the cable channel, the cable paths being generally vertical and horizontally spaced apart about the cable channel along the walls defining the channel;
numbering the openings sequentially from top to bottom, and numbering the cable paths sequentially from the cable path nearest the rack and nearest the front of the channel;
inserting a telecommunications cable from a numbered cable opening into the corresponding numbered cable path.

15. The method of claim 14, wherein a plurality of cable channels defined by walls of the cable riser are provided within the cable riser, each cable channel having a plurality of generally vertical, horizontally spaced apart cable paths about the channel along the walls defining the channel, each channel having a plurality of vertically spaced apart openings through which cables from the adjacent telecommunications equipment rack enter the cable riser, and each channel independently numbers and designates the openings and paths within that channel.

16. A cable clip comprising:
an outer housing including a first end with an inner portion and an outer portion, a second end with an inner portion and an outer portion, and a side with an inner portion and an outer portion, the inner portions of the first end, the second end and the side defining an open sided space;
the outer portions of the first end, the second end and the side including first, second and rear grooves, respectively, for receiving a first edge, a second edge and a rear edge, respectively, of a mounting opening, the first and second grooves adapted to receive a tab formed in each of the first and second edges of the mounting opening and orient the housing within the mounting opening;
the first end including a gate and the second end including a catch, and the gate hingedly connected at the first end and adapted to releasably engage the catch, the gate covering the open sided space when in a closed position engaging the catch and being movable to an open position upon disengaging the catch.

17. The cable clip of claim 16, wherein the outer housing includes a trumpet flare along the inner portions of the first end, the second end and the side to provide bend radius protection to cables received within the open sided space.

18. The cable clip of claim 16, wherein a plurality of members extend from the inner portion of the side into the open space defining a plurality of open ended cable slots within the open space, the cable slots having a depth and a width, the members being spaced apart so that the width of the cable slots is sized to receive telecommunications cable.

19. A cable riser comprising:
a first wall having a front edge, a rear edge, a first side and a second side;
a second wall having a first edge, a second edge, a first side and a second side, and being connected along the first edge to rear edge of the first wall;
a third wall having a first edge, a second edge, a first side and a second side, and being connected to the second edge of the second wall along the second edge to the second edge of the second wall;
the first side of the first wall, the first side of the second wall and the first side of the third wall cooperating to define an open sided channel;
a plurality of cable clips;
the front edge of the first wall having a plurality of mounting openings receiving the cable clips to organize and hold telecommunications cables and allow the cables to pass into the channel of the cable riser;

the mounting openings having a top edge, a side edge and a bottom edge, the top and bottom edges each including a tab extending partially into the mounting opening, the tabs being of different sizes and adapted to be received within openings in a top and a bottom, respectively, of one of the cable clip to orient the cable clip within the mounting opening; and each of the cable clips including a trumpet flare to provide bend radius protection for telecommunications cables received in the open sided space and passing into the open sided channel.

20. The cable riser of claim 19, wherein the open sided channel extends generally vertically and includes a top and a bottom, the channel defining a narrower cross section at the bottom than at the top.

21. The cable riser of claim 19, wherein the cable clip comprises:

an outer housing including a top with an inner portion and an outer portion, a bottom with an inner portion and an outer portion, and a side with an inner portion and an outer portion, the inner portions of the top, bottom and side defining an open sided space;

the bottom including a gate and the top including a catch, and the gate hingedly connected at the top and adapted to releasably engage the catch, the gate covering the open side space when in a closed position engaging the catch and being movable to an open position upon disengaging the catch.

22. The cable riser of claim 21, wherein the outer portions of the top, bottom and side have upper, lower and rear grooves, respectively, adapted to receive the top, side and bottom edges, respectively, of the mounting opening, and the upper and lower grooves having recesses for adapted to receive the different sized tabs formed in each of the top and bottom edges, respectively, of the mounting opening.

23. The cable riser of claim 21, wherein a plurality of cable routing clips are mounted to the first side of the first wall, the first side of the second wall and the first side of the third wall within the channel, the clips cooperating to define a plurality of generally vertical cable paths within the channel; and each of the cables passing through the cable clips in the front edge of the first wall being held within one of the plurality of cables paths inside the riser.

24. The cable riser of claim 23, wherein the number of cable clips and the number of cable paths provided by the cable routing clips within the riser are equal.

25. A cable riser comprising:

a first wall having a front edge, a rear edge, a first side and a second side;

a second wall having a first edge, a second edge, a first side and a second side, and being connected along the first edge to rear edge of the first wall;

a third wall having a first edge, a second edge, a first side and a second side, and being connected to the second edge of the second wall along the second edge to the second edge of the second wall;

the first side of the first wall, the first side of the second wall and the first side of the third wall cooperating to define an open sided channel;

the front edge of the first wall having a plurality of mounting openings adapted to receive a cable clip to organize and hold telecommunications cables and allow the cables to pass into the channel of the cable riser; and the mounting openings having a top edge, a side edge and a bottom edge, the top and bottom edges each including a tab extending partially into the mounting opening, the tabs being of different sizes and adapted to orient the cable clip within the mounting opening.

26. A cable clip with cable segregator comprising:

an outer housing including a first end with an inner portion and an outer portion, a second end with an inner portion and an outer portion, and a side with an inner portion and an outer portion, the inner portions of the first end, the second end and the side defining an open sided space;

a plurality of members extending from the inner portion of the side into the open space defining a plurality of open ended cable slots within the open space, the cable slots having a depth and a width;

the members being spaced apart so that the width of the cable slots is sized to receive telecommunications cable; and the outer portions of the first end, the second end and the side including first, second and rear grooves, respectively, for receiving a first edge, a second edge and a rear edge, respectively, of a mounting opening, the first and second grooves having recesses for receiving a tab formed in each of the first and second edges of the mounting opening.

27. The cable clip of claim 26, wherein the depth of the slots is sized to receive two telecommunications cables in each slot.

28. The cable clip of claim 27, wherein the width of the slots varies from the nominal width along the depth, with a narrower than nominal portion at the open end of the slot, and a plurality of wider than nominal portions along the depth of the slot.

29. The cable clip of claim 28, wherein the number of slots defined within the open space is eight.

30. The cable clip of claim 29, wherein the first end includes a pivot and the second end includes a catch, and a gate engages and rotates about the pivot and is adapted to releasably engage the catch, the gate covering the open end of the slots when in a closed position engaging the catch and being movable to an open position upon disengaging the catch.

31. A cable riser comprising:

a first wall having a front edge, a rear edge, a first side and a second side;

a second wall having a first edge, a second edge, a first side and a second side, and being connected along the first edge to rear edge of the first wall;

a third wall having a first edge, a second edge, a first side and a second side, and being connected to the second edge of the second wall along the second edge to the second edge of the second wall;

the first side of the first wall, the first side of the second wall and the first side of the third wall cooperating to define an open sided channel;

a plurality of cable clips each including an outer housing including a top with an inner portion and an outer portion, bottom with an inner portion and an outer portion, and a side with an inner portion and an outer portion, the inner portions of the top, bottom and side defining an open sided space, the bottom including a gate and the top including a catch, and the gate hingedly connected at the bottom and adapted to releasably engage the catch, the gate covering the open side space when in a closed position engaging the catch and being movable to an open position upon disengaging the catch;

the front edge of the first wall having a plurality of mounting openings receiving the cable clips to organize and hold telecommunications cables and allow the cables to pass into the channel of the cable riser;

the mounting openings having a top edge, a side edge and a bottom edge;

the inner portions of the top, bottom and side of each of the cable clips including a trumpet flare to provide bend radius protection for telecommunications cables received in the open sided space and passing into the open sided channel;

a plurality of cable routing clips mounted to the first side of the first wall, the first side of the second wall and the first side of the third wall within the channel, the clips cooperating to define a plurality of generally vertical cable paths within the channel; and each of the cables passing through the cable clips in the front edge of the first wall being held within one of the plurality of cables paths inside the riser.

* * * * *

UNITED STATES PATENT AND TRADEMARK OFFICE
CERTIFICATE OF CORRECTION

PATENT NO. : 6,768,858 B2
DATED : July 27, 2004
INVENTOR(S) : Tinucci et al.

It is certified that error appears in the above-identified patent and that said Letters Patent is hereby corrected as shown below:

Title page,
Item [57], ABSTRACT, should read as follows:
-- A cable clip with cable segregator includes ends and a side defining an open space, a series of open ended slots for holding and organizing telecommunications cables defined in the open space and outer grooves for mounting the cable clip with segregator into a mounting opening. The slots can be deep enough to hold two cables and may have an interior profile with a narrow opening, a nominal width, and one or more widened portions for receiving cables of different sizes and shapes. The cable clip with cable segregator can also include trumpet flares around the edges of the ends and side to provide bend radius protection for cables passing through the clip. The present invention also relates to a cable riser with cable clips with segregators mounted in a wall of the riser to hold and organize telecommunications cables that pass into the riser. The present invention also relates to a cable riser with cable clips with segregators mounted in a wall of the riser to hold and organize telecommunications cables that pass into the riser, and cable routing clips mounted within the riser defining a plurality of vertical cable paths within the riser. The present invention also relates to a method of loading cable in the riser into a specific cable path based on the entry location through which the cable enters the riser. --

Column 6,
Line 12, "minor" should read -- mirror --

Signed and Sealed this

Fourteenth Day of December, 2004

JON W. DUDAS
*Director of the United States Patent and Trademark Office*